United States Patent
Li

(10) Patent No.: US 10,867,396 B1
(45) Date of Patent: Dec. 15, 2020

(54) AUTOMATIC VISION SENSOR ORIENTATION

(71) Applicant: X Development LLC, Mountain View, CA (US)

(72) Inventor: Yueqi Li, San Jose, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 157 days.

(21) Appl. No.: 16/223,575

(22) Filed: Dec. 18, 2018

(51) Int. Cl.
| | |
|---|---|
| G06T 7/246 | (2017.01) |
| G06T 7/292 | (2017.01) |
| H04N 5/232 | (2006.01) |
| G06K 9/00 | (2006.01) |
| B25J 9/16 | (2006.01) |
| G05D 1/00 | (2006.01) |
| G06K 9/46 | (2006.01) |

(52) U.S. Cl.
CPC ............ G06T 7/246 (2017.01); B25J 9/1697 (2013.01); G05D 1/0094 (2013.01); G06K 9/00664 (2013.01); G06K 9/4609 (2013.01); G06T 7/292 (2017.01); H04N 5/23299 (2018.08); *G06T 2207/10016* (2013.01); *G06T 2207/10024* (2013.01)

(58) Field of Classification Search
CPC ........... G06T 1/0014; G06T 3/60; G06T 7/20; G06T 7/246; G06T 7/248; G06T 7/292; G06T 7/73; G06T 7/74; G06T 7/97; G06K 9/00664; G06K 9/4604; G06K 9/4609
See application file for complete search history.

(56) References Cited

U.S. PATENT DOCUMENTS

| | | | |
|---|---|---|---|
| RE38,420 E | 2/2004 | Thomas | 348/140 |
| 7,162,056 B2 | 1/2007 | Burl et al. | 382/104 |
| 7,211,980 B1 | 5/2007 | Bruemmer et al. | 318/587 |
| 8,209,074 B2 | 6/2012 | Sonoura | 702/23 |
| 2013/0041508 A1 | 2/2013 | Hu et al. | 700/259 |
| 2015/0269439 A1 | 9/2015 | Versace et al. | G06K 9/00664 |

(Continued)

FOREIGN PATENT DOCUMENTS

WO 2016080605 A1 5/2016

OTHER PUBLICATIONS

Malm, et al. "Simplified intrinsic camera calibration and hand-eye calibration for robot vision." In IROS, pp. 1037-1043 Oct. 2003.

(Continued)

*Primary Examiner* — Andrew W Johns
(74) *Attorney, Agent, or Firm* — Middleton Reutlinger

(57) ABSTRACT

Implementations are described herein are directed to reconciling disparate orientations of multiple vision sensors deployed on a mobile robot (or other mobile vehicle) by altering orientations of the vision sensors or digital images they generate. In various implementations, this reconciliation may be performed with little or no ground truth knowledge of movement of the robot. Techniques described herein also avoid the use of visual indicia of known dimensions and/or other conventional tools for determining vision sensor orientations. Instead, techniques described herein allow vision sensor orientations to be determined and/or reconciled using less resources, and are more scalable than conventional techniques.

20 Claims, 7 Drawing Sheets

(56) References Cited

U.S. PATENT DOCUMENTS

2017/0102467 A1* 4/2017 Nielsen et al. ......... G01S 19/49

OTHER PUBLICATIONS

Lee, et al. "Real-time joint estimation of camera orientation and vanishing points." In Proceedings of the IEEE Conference on Computer Vision and Pattern Recognition, pp. 1866-1874 2015.

De La Escalera, et al. "Automatic chessboard detection for intrinsic and extrinsic camera parameter calibration." Sensors 10, No. 3; pp. 2027-2044 Mar. 15, 2010.

Knight, et al. "Automated alignment of robotic pan-tilt camera units using vision." International Journal of Computer Vision 68, No. 3; pp. 219-237 Apr. 1, 2006.

Roach, et al. "Determining the movement of objects from a sequence of images." IEEE Transactions on Pattern Analysis and Machine Intelligence 6; pp. 554-562. Nov. 6, 1980.

Schmidt, et al. "Calibration of the multi-camera registration system for visual navigation benchmarking." International Journal of Advanced Robotic Systems, 11; 12 pages 2014.

Heng, et al. "Camodocal: Automatic intrinsic and extrinsic calibration of a rig with multiple generic cameras and odometry." In Intelligent Robots and Systems (IROS), 2013 IEEE/RSJ International Conference on, pp. 1793-1800. IEEE Nov. 3, 2013.

Shi, J. "Single View Geometry"; University of Pennsylvania; course material; Spring 2015 lecture; 52 pages; retrieved from Internet: http://cis.upenn.edu/~cis580/Spring2015/Lectures/cis580-02-camera-geometry.pdf.

McGarey, P. "Visual Odometry (VO)", CSC2451; Institute for Aerospace Studies, University of Toronto; 36 pages; Feb. 9, 2016; retrieved from internet: http://www.cs.toronto.edu/~urtasun/courses/CSC2541/03_odometry.pdf.

Shapiro, et al. "Motion from 2D Image Sequences"; University of Washington Computer Science & Engineering; Chapter 9, course material; Mar. 2000; 30 pages; retrieved from internet: https://courses.cs.washington.edu/courses/cse576/book/ch9.pdf.

Frank, et al. "Camera Calibration", (2009) Robotics 2 course, University of Freiburg, course material; 40 pages; retrieved from internet: http://ais.informatik.uni-freiburg.de/teaching/ws09/robotics2/pdfs/rob2-08-camera-calibration.pdf.

"Camera Calibration", (2013) retrieved from internet: https://www.cs.umd.edu/class/fall2013/cmsc426/lectures/camera-calibration.pdf; 31 pages.

"Motion Analysis"; Chapter 14, University of Iowa, course material; 7 pages; dated Nov. 6, 2018; retrieved from internet: http://user.engineering.uiowa.edu/~dip/lecture/Motion1.html.

* cited by examiner

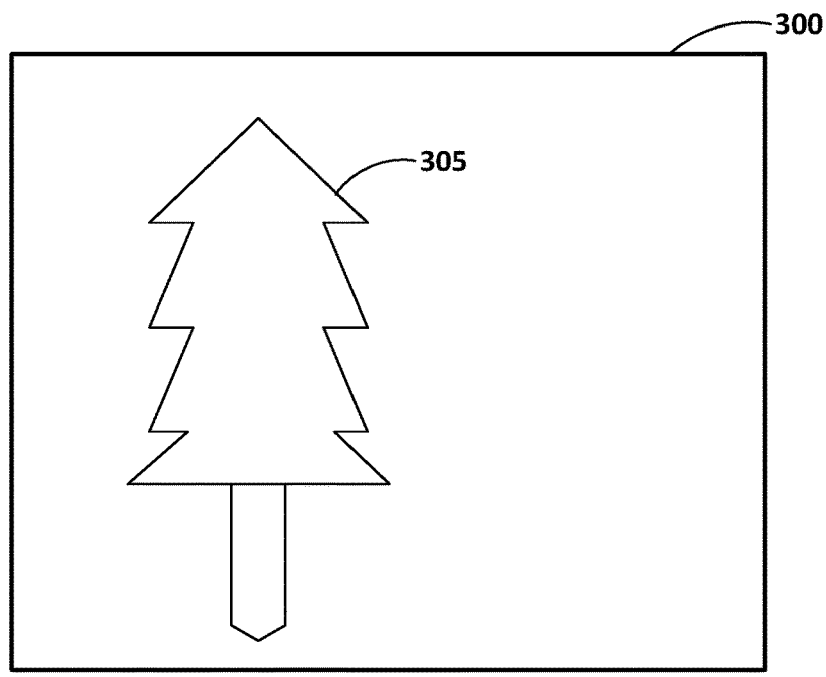
Fig. 3A
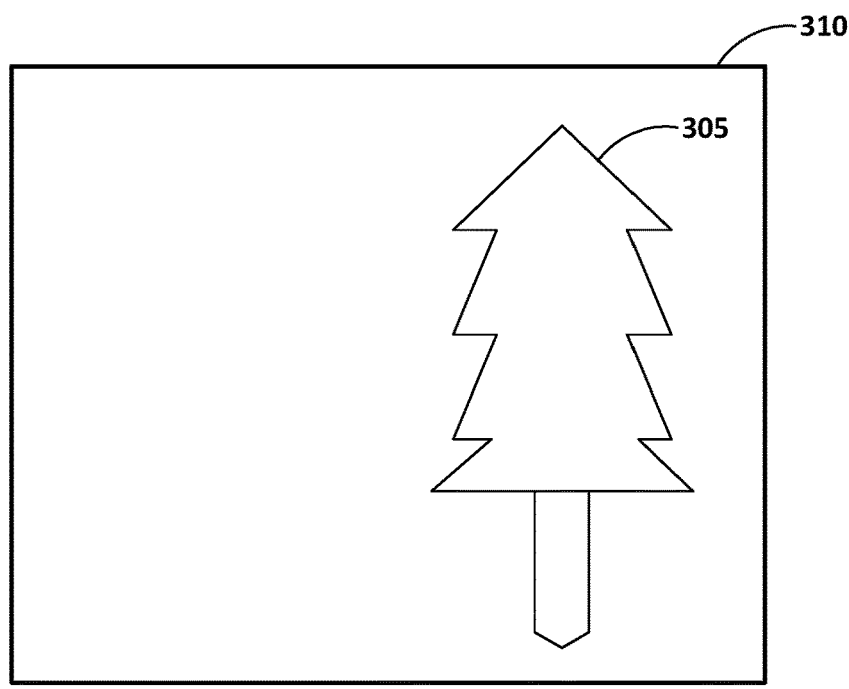
Fig. 3B
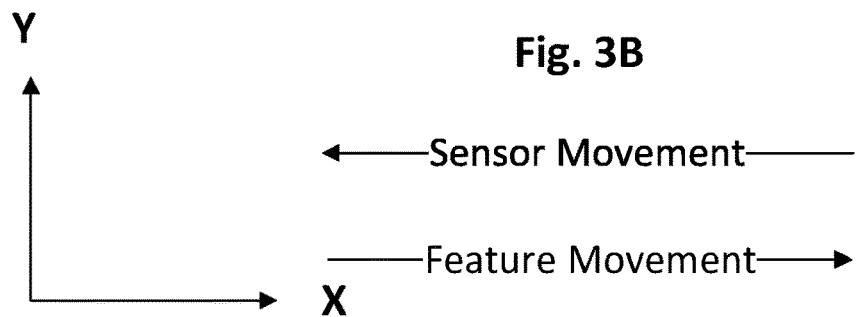

AUTOMATIC VISION SENSOR ORIENTATION

BACKGROUND

Robots are often equipped with multiple vision sensors such as cameras, 2.5D sensors, etc. In many cases a robot will employ multiple vision sensors at once to perform various operations, such as localization, mapping, etc. With precision engineering, multiple cameras may be mounted on a robot at close to the same orientations as possible. However, this may require that hardware integral and/or mounted to the robot meet very specific constraints, that hardware is mounted to the robot properly and securely, and that there is little to no variation between dimensions of various robotic components. And even with the best of efforts, vision sensors may become disoriented relative to one another over time, e.g., as a consequence of the robot being operated in dynamic and/or harsh environments.

Additionally, to make robots more commercially viable, there is a trend towards using less expensive components and/or manufacturing processes and compensating for the resulting hardware deficiencies using software. However, many of these software solutions, such as those that employ kinematic calibration and/or visual aids like checkerboards, can be relatively resource-intensive, unreliable, not generally scalable, and may require ground truth positional data, such as odometry and/or global position system ("GPS") data.

SUMMARY

Implementations disclosed herein are directed to reconciling disparate orientations of multiple vision sensors deployed on a mobile robot (or other mobile vehicle) by altering orientations of the vision sensors or digital images they generate. In various implementations, this reconciliation may be performed with little or no ground truth knowledge of movement of the robot. Techniques described herein also avoid the use of visual indicia of known dimensions and/or other conventional tools for determining vision sensor orientations. Instead, techniques described herein allow vision sensor orientations to be determined and/or reconciled using less resources, and are more scalable than conventional techniques.

Techniques described herein may have a wide variety of applications. In some implementations, techniques described herein may be used to analyze digital images captured by a vision sensor integral with a robot. Such a robot may take various forms, such as a ground-based mobile robot that uses mechanisms such as wheels, casters, robotic limbs, and/or tracks to move around, an unmanned aerial vehicle (sometimes referred to as a "drone"), a satellite, and so forth.

In various implementations, two or more sequences of digital images captured by two or more vision sensor integral with a robot may be obtained. These sequences may be obtained and analyzed in real time, or they may be obtained after the fact, e.g., from a database in which images captured by the robot are stored. The vision sensors (and hence, the digital images they capture) may take various forms, such as an RGB camera, a vision sensor that also captures depth data (e.g., a "2.5D" vision sensor or camera), an infrared camera, or any other vision sensor that produces digital images having pixels (or voxels).

In some implementations a sequence of digital images may comprise a sequence of distinct digital images acquired at a set frequency, such as a video feed. However, the frequency at which the digital images are acquired need not necessarily be captured at frequencies typically associated with video feeds. It is sufficient that the digital images be captured at a frequency in which at least some portions of two digital images of the sequence depict overlapping scenery, i.e., capture the same "features" of the environment in which the robot operates.

In various implementations, various techniques for feature detection and/or matching may be employed to identify, for each sequence of digital images generated by a respective vision sensor, a plurality of what will be referred to herein as "region pairs." Both regions of each given region pair may include one or more pixels depicting a respective common feature (e.g., a tree, stationary object, architectural feature, natural feature of a landscape, etc.) of an environment captured across the two or more digital images in which the region pairs were identified.

In some implementations, an average movement offset may be calculated from the plurality of region pairs, e.g., in the x and y directions in a two-dimensional space of the digital images. These operations may be performed in some implementations across more than two digital images of a given sequence, which may result in more accuracy. For example, single image movement across two digital images (which can be, but are not required to be, consecutive) may be summarized by the average x movement $S_x$ and the average y movement $S_y$. Multiple images movements across i (positive integer) images may yield a sequence of image movements, $S_x^1, S_x^2, \ldots$ and $S_y^1, S_y^2, \ldots$. In some implementations, a total direction of feature movement along x, $T_x$, and a total direction of feature movement along y, $T_y$, may be computed, e.g., as a sum of the individual image movements.

Once the total directions of movement $T_x$, $T_y$, are known for multiple streams of digital images captured by multiple vision sensors of a robot, they may be used to determine what will be referred to herein as "major directions of feature movement." Intuitively, the major directions of feature movement of a sequence of digital images may represent a most common direction of movement of features depicted across the images. Suppose a robot is moving from left to right but remains at a constant elevation. The major direction of feature movement across digital images captured by a vision sensor integral with the robot would be the opposite of the robot's movement, i.e. from right to left. Likewise, if the robot is moving up but not laterally, a major direction of feature movement across digital images captured by the vision sensor integral with the robot would be up to down.

In some implementations, once the major direction of movement m for a given sequence of digital images is determined, it may be used to reconcile the orientation of the vision sensor that itself generated the images, and/or orientations of the sequence of digital images themselves, with that of another vision sensor/sequence of digital images. In some implementations, various heuristics can be employed to determine how to rotate a vision sensor or digital image(s) it acquires to be in alignment with another vision sensor. For example, in some implementations, the major direction of feature movement in images captured by a first image sensor may be compared to the major direction of feature movement in images captured from a second image sensor. The orientations of one or more of the sensors may be altered and/or the images may be altered to reconcile the major directions of the sets of images to be the same. For example, if feature movement in images of a first set is in the x-direction and the feature movement in images in a second set of images is in the y-direction, one or both sensors may be rotated to reconcile both sensors to capture images with the same x-direction feature movement (or same y-direction feature movement). Thus, subsequent images captured by each of the sensors will be in the same direction.

The above description is not meant to be limiting. Other techniques may be employed in various implementations to perform more granular reconciliations than simply re-orientating by zero, ninety, or one hundred eighty degrees. For example, in some implementations, instead of a major direction of feature movement m being one-dimensional (i.e., x, −x, y, or −y), it may instead be computed from $T_x$ and $T_y$, e.g., as a vector in two-dimensional space having a direction and magnitude. The major direction of feature movement m may then be compared with other major directions of feature movement determined for other vision sensors/image feeds, and reconciliation may involve reorienting one vision sensor or another (or images they generate) so that the respective major directions of feature movement are aligned. In yet other implementations, gradient fields that represent pixel movement may be computed for sequences of digital images. Reconciliation of two or more sequences of digital images may involve alignment of their respective gradient fields.

Techniques described herein give rise to various technical advantages and benefits. As noted previously, conventional techniques that rely on visual indicia with known dimensions (e.g., checkerboard) have limited scalability and may be cumbersome, particularly where no spatial indicia having known dimensions are available. Techniques described herein, on the other hand, allow for vision sensor orientations to be reconciled using only multiple images captured by a vision sensor. Even ground truth positional data (e.g., odometry, GPS, etc.) is not required, although it can be used in some implementations to determine which vision sensor has a "correct" or "preferred" orientation. Implementations described herein are more scalable (e.g., less computationally expensive, do not require trained personnel to perform calibration, which reduces training costs) and available in a wider variety of scenarios. Thus, techniques described herein can be employed to help otherwise resource-constrained robots contribute to mapping operations that may be performed, for instance, as part of simultaneous localization and mapping ("SLAM") operations. Moreover, techniques described herein, especially when performed across large numbers of digital images of a sequence, may reduce the impact of position coordinate error that is often inherent, e.g., in GPS or inertial measurement unit ("IMU") measurements, and enable hands-off deployment of robots (e.g., because an operate need not manually perform conventional techniques for multi-vision sensor orientation reconciliation).

The above is provided as an overview of some implementations disclosed herein. Further description of these and other implementations is provided below.

In some implementations, a method performed by one or more processors is provided that includes: obtaining a first sequence of digital images captured by a first vision sensor integral with a robot while the robot moves along a trajectory; obtaining a second sequence of digital images captured by a second vision sensor integral with the robot while the robot moves along the trajectory; analyzing two or more digital images of the first sequence to identify a first plurality of region pairs, wherein both regions of each region pair of the first plurality of region pairs include one or more pixels depicting a respective common feature of an environment captured across the two or more digital images of the first sequence; analyzing two or more digital images of the second sequence to identify a second plurality of region pairs, wherein both regions of each region pair of the second plurality of region pairs include one or more pixels depicting a respective common feature of the environment captured across the two or more digital images of the second sequence; analyzing the first plurality of region pairs to determine a first major direction of feature movement across the two or more digital images of the first sequence; analyzing the second plurality of region pairs to determine a second major direction of feature movement across the two or more digital images of the second sequence; reconciling any difference between the first and second major directions of feature movement by altering an orientation of: one of the first and second vision sensors, or one or more digital images of the first or second sequence of digital images.

In various implementations, the altering may include rotating one or more digital images of the first or second sequence of digital images so that the first and second major directions of movement correspond. In various implementations, the altering may include rotating the first or second vision sensor so that so that the first and second major directions of movement correspond.

In various implementations, the first and/or vision sensor may include an RGB camera or a 2.5D camera. In various implementations, each region of the first and second plurality of region pairs may include a single pixel, or multiple pixels. In various implementations, analyzing the two or more digital images of the first sequence may include performing feature detection analysis. In various implementations, analyzing the two or more digital images of the first sequence may include performing feature matching.

In another closely related aspect, a method implemented using one or more processors may include: obtaining a first sequence of digital images captured by a first vision sensor integral with a robot while the robot moves along a trajectory, wherein each of the digital images of the first sequence is comprised of rows and columns of pixels; analyzing two or more digital images of the first sequence to identify a first plurality of region pairs, wherein both regions of each region pair of the first plurality of region pairs include one or more of the pixels depicting a respective common feature of an environment captured across the two or more digital images of the first sequence; analyzing the first plurality of region pairs to identify a first major direction of feature movement across the two or more digital images of the first sequence; determining that the first major direction of feature movement is not parallel to a row or a column of pixels of the two or more digital images of the first sequence; and altering one of the first vision sensor or the two or more digital images of the first sequence of digital images to adjust the first major direction of feature movement to be parallel to a row or a column of the pixels.

In various implementations, the first major direction of feature movement is a vector corresponding to feature movement in both the vertical and horizontal directions. In various implementations, the first major direction of feature movement is an angle of movement relative to horizontal.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A and FIG. 3B depict images captured from a first vision sensor with feature movement in an x-direction.

DETAILED DESCRIPTION

Figure 1:
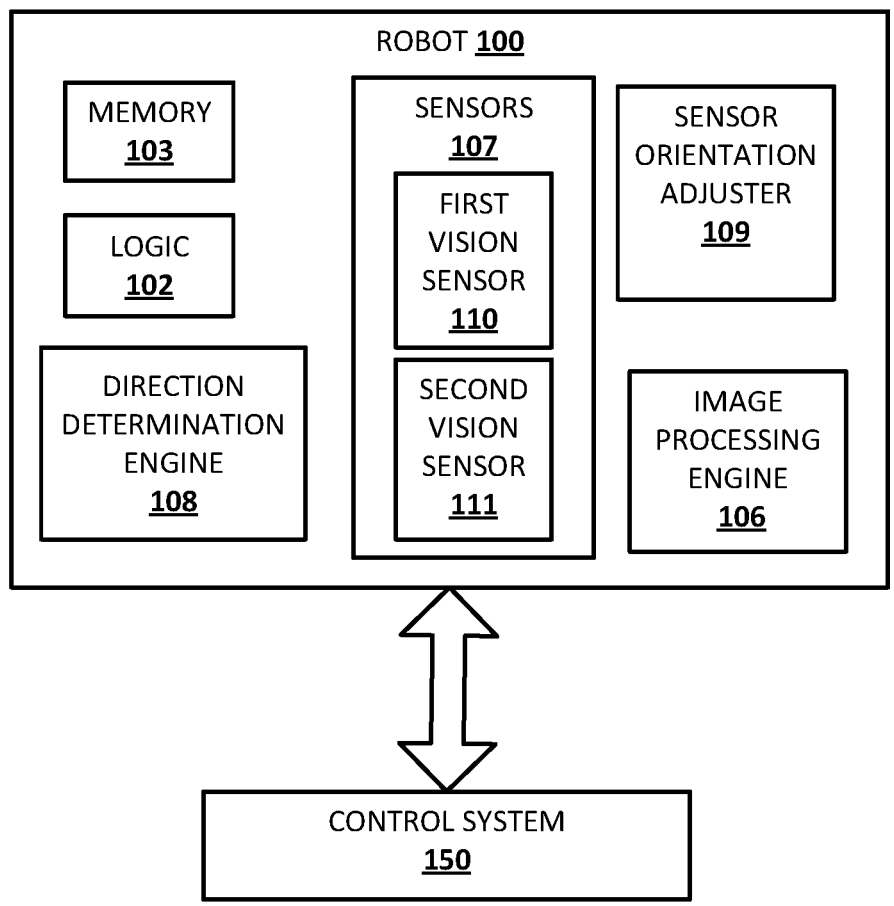
FIG. 1 schematically depicts an example environment in which disclosed techniques may be employed in accordance with various implementations.

Now turning to FIG. 1, a schematic diagram of an example environment in which selected aspects of the present disclosure may be practiced in accordance with various implementations is illustrated. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, a unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

Sensors 107 may take various forms, including but not limited to vision sensors, such as first vision sensor 110 and second vision sensor 111. Vision sensors 110 and 111 may be 3D laser scanners or other 3D vision sensors (e.g., stereographic cameras used to perform stereo visual odometry) configured to provide depth measurements, two-dimensional cameras, "2.5D" cameras, light sensors (e.g., passive infrared), etc. In addition to vision sensors 110 and 111, sensors 107 may include force sensors, pressure sensors, pressure wave sensors (e.g., microphones), proximity sensors (also referred to as "distance sensors"), torque sensors, bar code readers, radio frequency identification ("RFD") readers, radars, range finders, accelerometers, gyroscopes, compasses, position coordinate sensors (e.g., global positioning system, or "GPS"), speedometers, edge detectors, and so forth. While only two sensors 110 and 111 are shown depicted as being integral with robot 100, this is not meant to be limiting. In some implementations, sensors 107 may be located external to, but may be in direct or indirect communication with, robot 100, e.g., as standalone units or as part of control system 150.

Control system 150 may include one or computing systems connected by one or more networks (not depicted) that control operation of robot 100 to various degrees. An example of such a computing system is depicted schematically in FIG. 7. In some implementations, control system 150 may be operated by a user (not depicted) to exert a relatively high level of control over robot 100, e.g., in real time in response to signals received by a user interface and/or one or more readings from one or more sensors 107. For example, a user may interact with a graphical user interface rendered on a display (e.g., CRT, LCD, touchscreen, etc.) to interactively "jog" various components of the robot in various directions, e.g., by providing robot 100 with one or more input velocities for robot 100 itself and/or its components.

Figure 2:
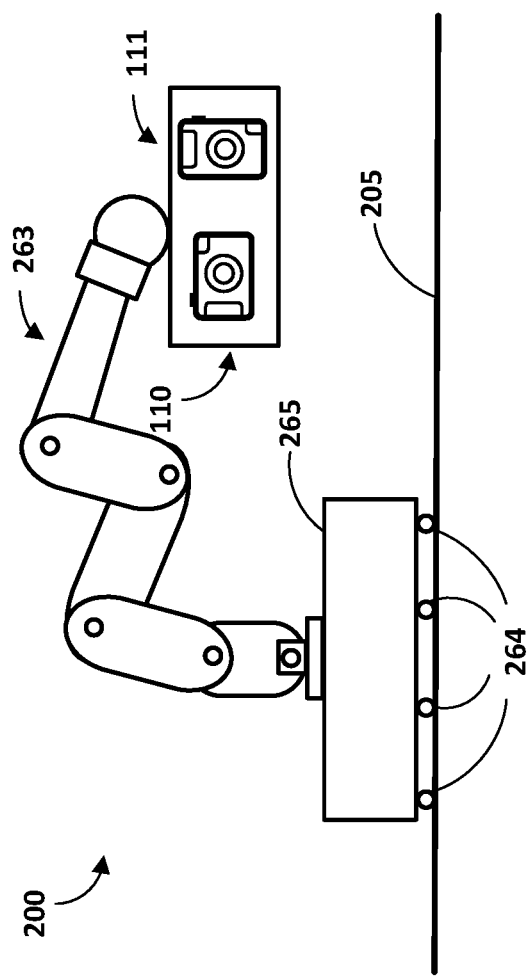
FIG. 2 depicts one example of how disclosed techniques may be practiced, in accordance with various implementations.

Referring to FIG. 2, an example robot 200 is depicted to demonstrate one example how techniques disclosed herein may be practiced. Robot 200 includes an arm 263 that includes a plurality of joints to allow the arm 263 to move into various positions. In this example, six joints are indicated. However, this is not meant to be limiting, and robots may have any number of joints. Two vision sensors 110 and 111 are attached to a sixth joint (sometimes referred to as an "end effector"). One or more of the joints of arm 263 may move into a position such that vision sensors 110 and 111 move along a horizontal trajectory, move along a vertical trajectory, and/or any combination thereof. Robot 200 also includes a base 265 that includes one or more wheels 264 to allow the robot 200 to move in one or more directions. In some implementations, robot 200 may include alternate configurations to allow the robot 200 to move. Thus, in addition to moving the arm 263 to scan a surface, movement of the robot 200 and/or of the vision sensors 110 and 111 may be aided by wheels 264.

Vision sensors 110 and 111 may capture digital images, such as the images depicted in FIGS. 3A through 5B. As used herein, "digital images" and "images" both refer to a captured representation of a physical field of view with a matrix of pixels, each pixel depicting a representation a portion of the physical field of view. While examples are described herein in terms of two-dimensional "pixels," this is not meant to be limiting; techniques described herein may be applicable with "voxels" as well. Referring again to FIG. 2, an image may be captured by the vision sensors 110 and 111 while the joints of arm 263 are in a first configuration and continue to capture images as the arm 263 moves to a second configuration. Also, for example, the wheels 264 may propel the robot 200 along a trajectory from a first position to a second position. As another example, the robot may be a component of an aerial vehicle (an airplane, helicopter, drone, etc.) and the first and second images may be captured while the vehicle is at a first coordinate and at a second coordinate once the vision sensors 110/111 move to a new position. In some implementations, the vision sensors 110 and 111 can capture multiple images as the sensors change position. For example, one or more of the vision sensors 110 and 111 may generate a digital video feed, capture images at a set frequency, and/or otherwise capture multiple images while the sensors 110 and 111, or the entire robot 100, travels along a trajectory.

As illustrated in FIG. 2, first vision sensor 110 is oriented at 90 degrees compared with the mounting of the second vision sensor 111. Because the orientations are different, directional movement of the robot 100 can be identified as different orientations in captured images. For example, first vision sensor 110 may be positioned such that horizontal movement of the robot 100 is captured as horizontal movement, while horizontal movement of the robot 100 may be captured as vertical movement by second vision sensor 111. Because the first vision sensor 110 and the second vision sensor 111 are oriented as 90 degrees from one another, captured movement of features in images may be at 90 degrees from each other (e.g., features may appear to move horizontally in images captured by first vision sensor 110 and may appear to move vertically in images captured by second vision sensor 111).

In some implementations, different orientations of the first vision sensor 110 and the second vision sensor 111 may not be intentional. For example, the robot 100 may have initially been constructed with the first vision sensor 110 and the second vision sensor 111 having the same orientation (e.g., both oriented parallel to the ground 205), but due to operation of the robot 100, one or both vision sensors 110 and 111 may have unintentionally been moved (e.g., jostled by robot movement, struck by a foreign object, natural wear on components). Thus, although both vision sensors 110 and 111 may have been oriented such that movement is interpreted as the same from both sensors 110 and 111, the sensors may no longer be in the intended positions.

Further, as depicted, second vision sensor 111 is oriented at 90 degrees to first vision sensor 110. However, the orientations of the sensors may be any angle relative to each other and/or to the ground 205. For example, first vision sensor 110 may be oriented parallel to the ground 205, while second vision sensor 111 may be oriented a degree or less from parallel to the ground 205. Further, although at least one of the sensors 110 and 111 is depicted as parallel to the ground 205, both sensors 110 and 111 may be oriented at any angle relative to the ground 205 or each other (e.g., first vision sensor 110 may be oriented at 45 degrees from the ground 205 and second vision sensor 111 may be oriented at 5 degrees from parallel to the ground 205).

Referring again to FIG. 1, image processing engine 106 receives a first sequence of digital images captured by the first vision sensor 110 while the robot 100 moves along a trajectory. The first sequence of digital images includes at least one region that is captured in a plurality of the images. For example, the first sequence of images may be frames of a video captured by the first vision sensor 110 such that an object captured in a first frame is also captured in one or more subsequent frames.

Referring to FIGS. 3A and 3B, an example of two images of an image sequence captured by the first vision sensor 110 is provided. The first image 300 includes a captured depiction of a tree 305 and the second image 310 also includes a region that depicts the tree 305 but in a different position within the frame. Image processing engine 106 can analyze the two frames and identify the depiction of the tree 305 as a region that is a common feature of each of the images. Put another way, the first set of pixels depicting tree 305 in image 300 and the second set of pixels depicting tree 305 in image 310 may form a "region pair" that depict a common feature, namely, tree 305. While an easily recognizable object in the form of a tree is used in examples described herein, it should be understood that any common feature, regardless of whether that feature would be apparent ore recognizable to a human, can be used to perform techniques described herein.

In some implementations, multiple images may be obtained and analyzed by image processing engine 106 to identify region pairs between images that depict a common feature. For example, referring again to FIGS. 3A and 3B, a third image may also be obtained that depicts the same tree 305 which image processing engine 106 can analyze to identify the additional depiction of the tree 305. Also, for example, image 310 may depict an additional feature that is not included in image 300 but that is captured in a subsequent image. Thus, two different regions that depict different common features may be identified over a sequence of images (e.g., a second tree in image 310 that is not in image 300 but that is depicted in a third image).

Image processing engine 106 may utilize one or more methods of feature detection and/or feature matching to determine the region pairs between images. For example, image 300 may be analyzed and features identified in image 300 may be compared with features identified in image 310 to determine a common region between the images. In various implementations, a region pair that is identified may be of any size, from a single pixel to a larger feature that is present in multiple images.

Figure 4A:
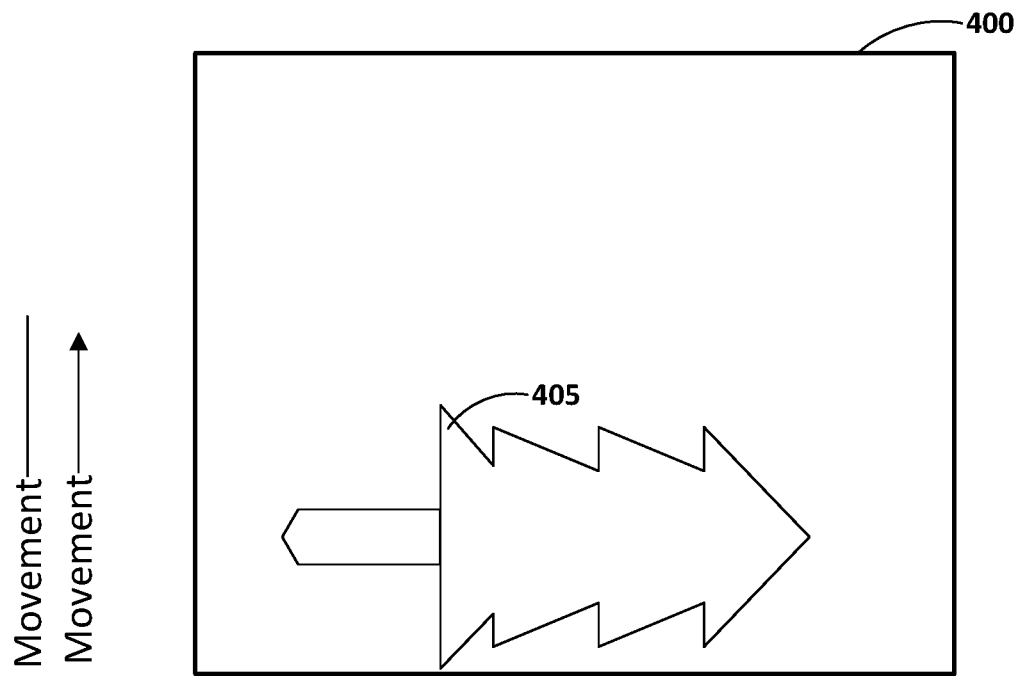
FIG. 4A and FIG. 4B depict images captured from a second vision sensor with feature movement in a y-direction.
Figure 4B:
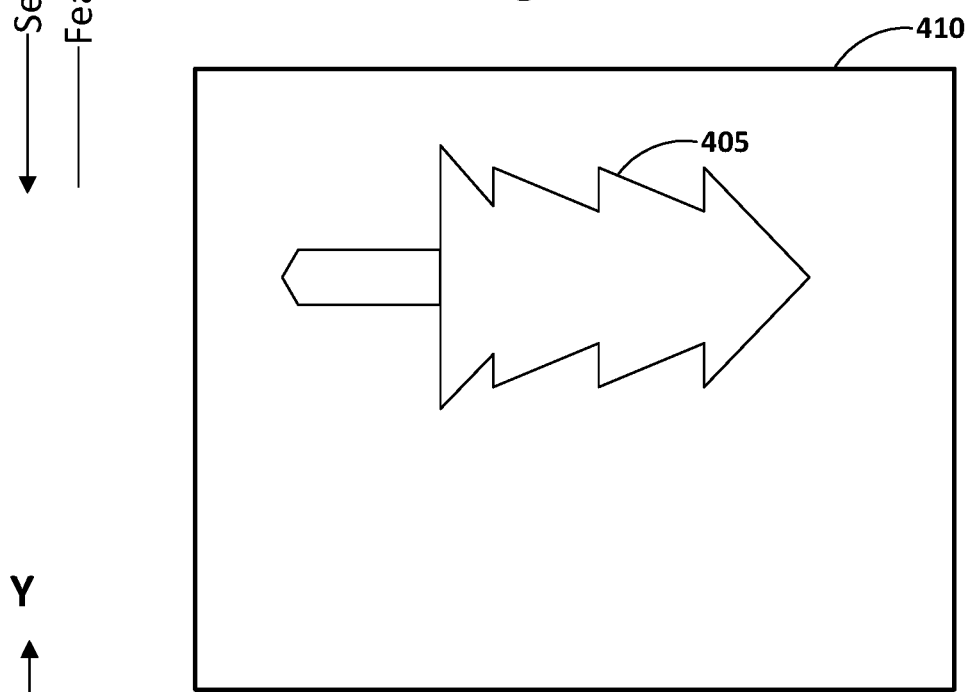

Similarly, image processing engine 106 obtains a second sequence of images from second vision sensor 111 to analyze and identify a second region of common features while the robot 100 moves along the same trajectory. Referring to FIGS. 4A and 4B, two images 400 and 410 include depictions of a common feature that is a tree 405. In some implementations, tree 405 may be the same feature as tree 305. However, in some implementations, second vision sensor 111 may capture entirely different features which image processing engine 106 may analyze to identify region pairs between images of the second sequence.

Image processing engine 106 determines the pixel locations of the region pairs identified in the first sequence of images from the first vision sensor 110 and provides the pixel locations to the direction determination engine 108. For example, referring again to FIG. 3A, image processing engine 106 can identify the pixels that depict the tree 305 in image 300 and further identify the pixels that depict the same feature (i.e., tree 305) in the second image 310. Because the region pair between the images has moved from the first image 300 to the second image 310, the pixel locations are different for each of the images.

Direction determination engine 108 can determine a first major direction of the trajectory of robot 100 based on the feature movement (i.e., pixel changes for the feature) between images of the first sequence of images. The major direction of feature movement of a sequence of digital images may represent a most common direction of movement of features depicted across the images. Suppose robot 100 is moving from left to right but remains at a constant elevation. The major direction of feature movement across digital images captured by a vision sensor integral with the robot would be the opposite of the robot's movement, i.e. from right to left, as illustrated with FIGS. 3A and 3B. Likewise, if the robot is moving up but not laterally, a major direction of feature movement across digital images captured by the vision sensor integral with the robot would be up to down, as illustrated with FIGS. 4A and 4B.

For each of the region pairs, direction determination engine 108 can determine the major direction of feature movement and subsequently a direction of movement of the robot 100. In some implementations, direction determination engine 108 can determine major directions of feature movement and/or total directions of feature movement using various techniques and/or heuristics. For example, direction determine engine 108 can determine a total direction of feature movement in the x-direction, $T_x$, and a total direction of feature movement in the y-direction, $T_y$. In some implementations, the following algorithm may be employed to determine a major direction of feature movement, m, across a sequence of digital images:

If $(|T_x|>|T_y| \&\& T_x>0)$ {
m="x"
} else If $(|T_x|>|T_y| \&\& Tx<0)$ {
m="-x"
} else if $(|T_x|<|T_y| \&\& T_y<0)$ {
m="-y"
} else {
m="y"
}

In this algorithm, direction determination engine 108 determines whether the movement in the x-direction or y-direction is greater and then determines a major feature movement direction for the images based on the greater of the feature movement directions. For example, direction determination engine 108 can determine that the major direction of feature movement is "x" if the movement of the features is more in the x-direction than the y-direction and the movement is from left to right. FIGS. 3A and 3B illustrate feature movement that is primarily positive in the x-direction (i.e., m="x"). Also, for example, direction determination engine 108 can determine that the major direction of feature movement is "y" if the movement of the features is more in the y-direction than the x-direction and the movement is from bottom to top. FIGS. 4A and 4B illustrate feature movement that is primarily positive in the y-direction (i.e., m="y").

In some implementations, direction determination engine 108 may determine a major direction of feature movement that is not entirely in an x-direction or a y-direction. For example, referring to FIGS. 5A and 5B, an example two images of a sequence are illustrated where the major direction of movement is not entirely in the x-direction or the y-direction. The tree 505 moves from the first image 500 position to the second image 510 position, which is not entirely a shift from left to right nor a shift entirely from bottom to top of the images. In some implementations, direction determination engine 108 may select a major direction of feature movement that is a combination of the movement in each axis of movement. For example, instead of a major direction being either "x" or "y," direction determination engine 108 may determine a direction that is a pair of values that indicate the relative movement along each axis (e.g., a pair of <5,2> to indicate that, for every 5 pixel movement in the x-direction, the feature moves 2 pixels in the y-direction). Also, for example, direction determination engine 108 may determine a major direction of feature movement that is indicated by a slope, an angle relative to an axis, a vector, one or more gradient fields, and/or other indications of a direction that is not either vertical or horizontal.

Direction determination engine 108 determines a major direction of feature movement for both the images from the first vision sensor 110 and the images from the second vision sensor 111. Because the robot 100 was on the same trajectory while each of the sequences of images were captured, the major direction for each of the sequences should coincide. However, if they do not, then one of the sensors and/or sequences of images can be adjusted to reconcile any differences between the first and second major directions of feature movement. For example, referring again to FIGS. 3A and 3B, direction determination engine 108 can determine that the major direction of feature movement is "x" (i.e., from left to right). Further, referring again top FIGS. 4A and 4B, direction determination engine 108 can determine that the major direction of feature movement is "y" (i.e., from bottom to top).

In some implementations, various heuristics can be employed by direction determination engine 108 to determine how to rotate vision sensor 110 itself or digital images acquired from vision sensor 110 to be in alignment with vision sensor 111 and/or the digital images acquired from vision sensor 111. For example, in some implementations, the following algorithm may be employed to determine how to reconcile orientations of vision sensor 110 and vision sensor 111 with two major directions of movement, m1 and m2, respectively:

```
Func GetRotationRule(m1, m2) {
    If (m1 == m2) {
        Return "NoRotation"
    } else if (m1 and m2 both same 'x' or 'y' letter and different signs) {
        Return "Rotation 180 degrees"
    } else if (m1 and m2 both different letters and different signs) {
        Return "rotation counterclockwise 90 degrees"
    } else {
        Return "rotation clockwise 90 degrees"
    }
}
```

Referring again to the figures, direction determination engine 108 can determine that the major direction of feature movement in the images from the first sensor 110 is "x" and further determine that the major direction of feature movement in the images from the second sensor 111 is "y." According to the algorithm above, the orientations can be reconciled by "rotation clockwise 90 degrees." Thus, after reconciliation, the major direction of feature movement for both sequences of images will be the same.

In some implementations, reconciliation of orientations can include rotation of one of the vision sensors. Continuing with the previous example, the orientations can be reconciled by a 90-degree rotation of second vision sensor 111. Once second vision sensor 111 is rotated, subsequent images captured by the second vision sensor 111 will have feature movement in the same major direction as feature movement in images captured by the first vision sensor 110. Similarly, first vision sensor 110 may instead be rotated to change its major direction of feature movement to match the major direction in images from the second vision sensor 111.

Sensor orientation adjuster 109 can be utilized to change the orientations of one or more vision sensors. For example, each of the vision sensors 110 and 111 may be attached to the robot 100 by a moveable component that is controllable by sensor orientation adjuster 109. Direction determination engine 108 can provide instructions to sensor orientation adjuster 109 to move one or both of the sensors to a new orientation. Sensor orientations adjuster 109 can then utilize one or more actuators to adjust the orientation of the vision sensor(s) (e.g., swiveling the vision sensor to a new orientation).

In some implementations, image processing engine 106 may alter the orientation of one or more of the digital images of the first and/or second sequence of images in lieu of moving the sensors themselves. For example, referring again to the figures, image processing engine 106 may alter the orientation of image 400 and 410 by 90 degrees, which would result in the major direction movement of the features of FIGS. 4A and 4B to be from left to right (i.e., the same as the major direction movement of the images in FIGS. 3A and 3B).

In some implementations, a preferred orientation may be known for the trajectory of the robot 100. For example, robot 100 may only be designed to move only horizontally. Thus, if one or more of the images from a vision sensor have a major direction of feature movement that is not horizontal, both sensors and/or images from both sensors may be altered so that the images will have a horizontal feature movement. Doing so improves the likelihood that subsequent images captured by the sensors that were originally not oriented horizontally to have a horizontal feature movement.

Figure 5A:
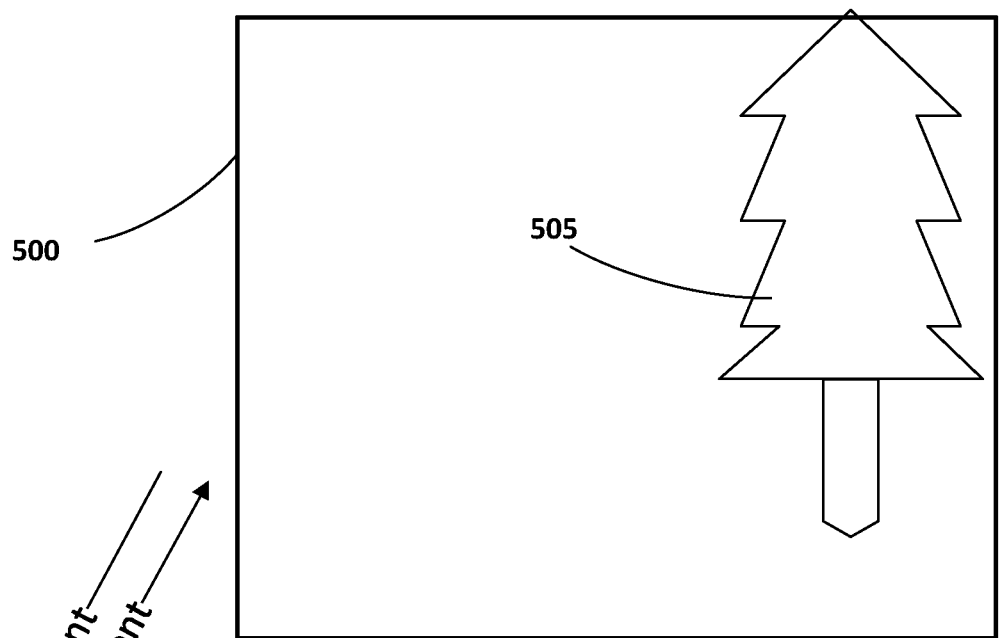
FIG. 5A and FIG. 5B depict images captured from a vision sensor with feature movement in both the x- and y-directions.
Figure 5B:
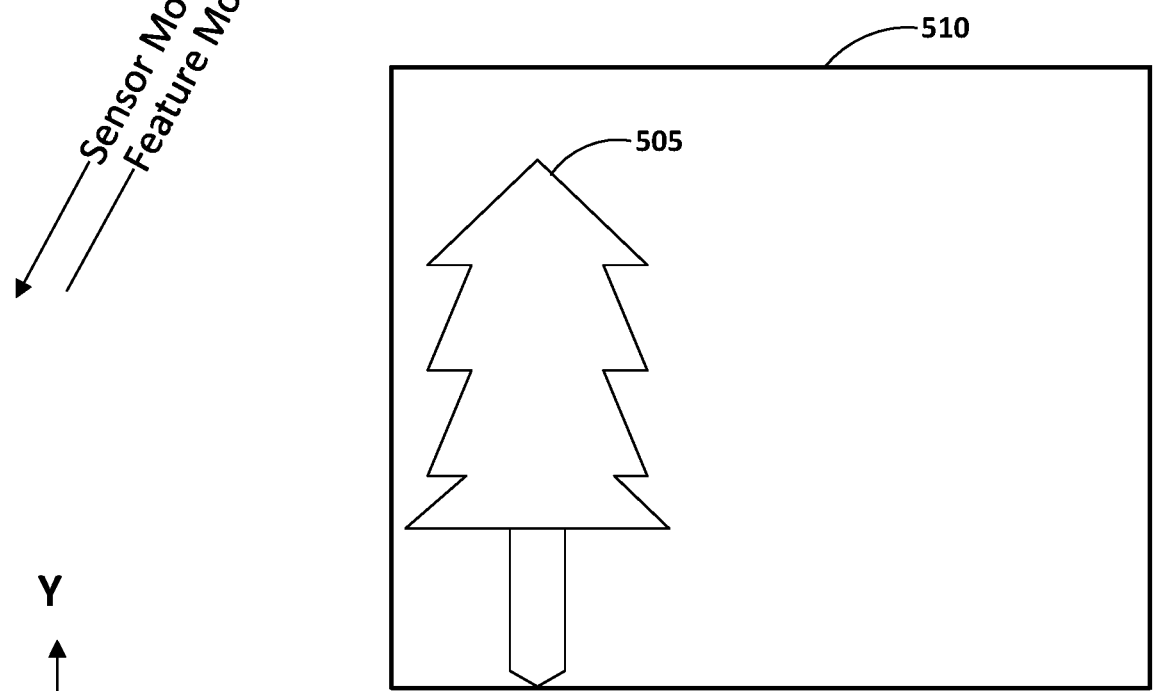

As previously discussed, in some implementations, direction determination engine 108 may determine a major direction that is not entirely in the x-direction or the y-direction, as illustrated by the images of FIGS. 5A and 5B. In some implementations, sensor orientation adjuster 109 may determine the orientation of one of the vision sensors by calculating an angle of rotation for the sensor. For example, direction determination engine 108 may determine that the images from first vision sensor 110 have a major direction movement of 10 degrees from the horizontal axis and/or relative to the orientation of the images from the second vision sensor 111. In some implementations, sensor orientation engine 109 may adjust one or both of the vision sensors 110 and 111 to have matching orientations (e.g., rotating one sensor 10 degrees). In some implementations, sensor orientations adjuster 109 may first adjust one (or both) of the sensors so that the major direction of feature movement is entirely in either the x- or y-direction and then utilize the previously discussed algorithm to further reconcile the major directions, if they do not match. Similarly, the images from the two sensors may be altered to align the major directions of movement by either changing the orientation of one sequence to match the other sequence or by changing both to have the same orientation in either the x-direction or the y-direction.

Figure 6:
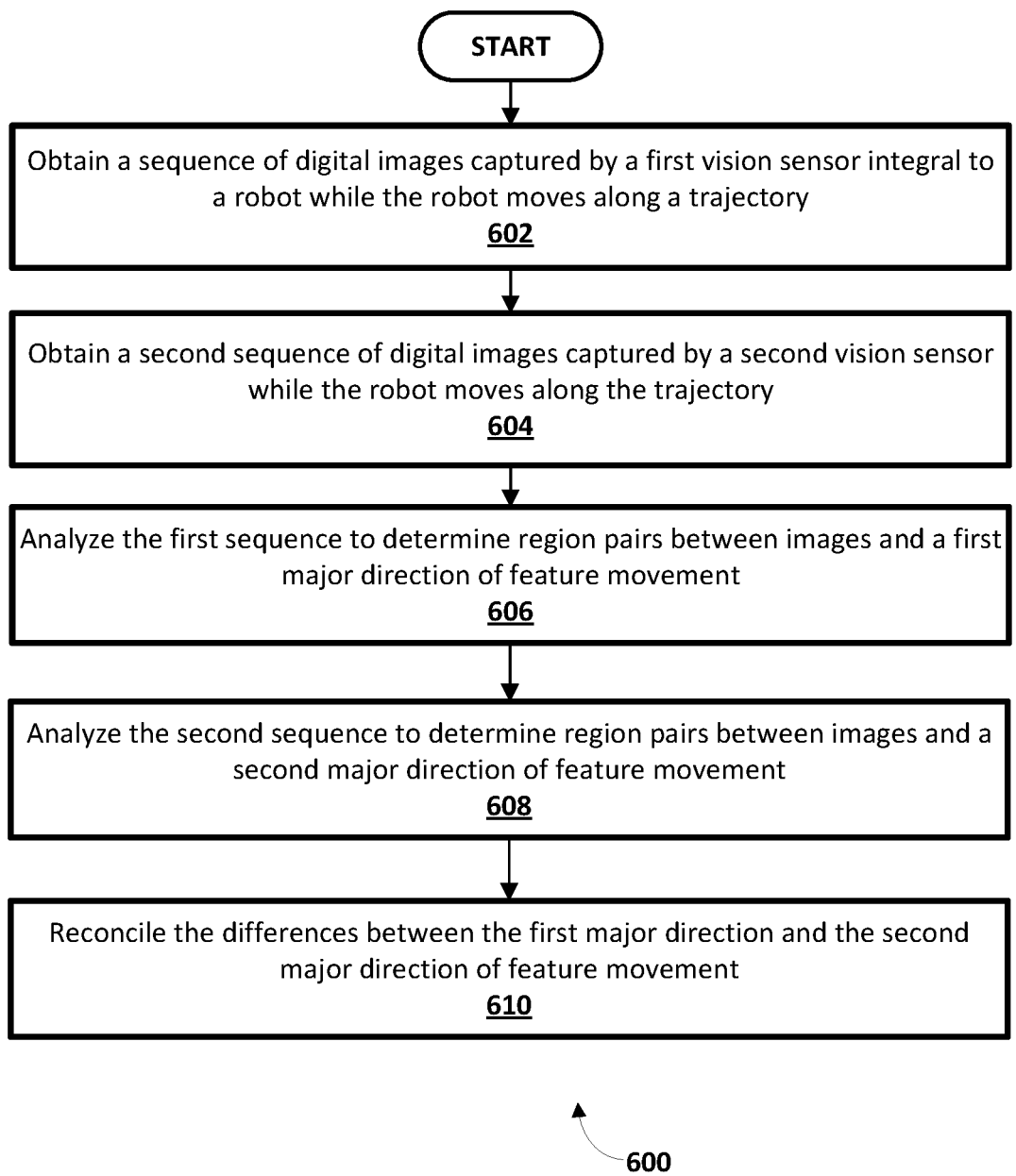
FIG. 6 illustrates a flowchart of an example method in accordance with various implementations described herein.

Referring to FIG. 6, a flowchart is provided of an example method in accordance with various implementations described herein. For convenience, the operations of the flowchart are described with reference to a system that performs the operations. This system may include various components of various computer systems. For instance, some operations may be performed at robot 100, while other operations may be performed by one or more components of control system 150. Moreover, while operations of method 600 are shown in a particular order, this is not meant to be limiting. One or more operations may be reordered, omitted or added.

At block 602, a sequence of digital images is obtained from a first vision sensor integral to a robot while the robot moves along a trajectory. The first vision sensor may share one or more characteristics with first vision sensor 110 and may be integral to a robot that shares one or more characteristics with robot 100. In some implementations, a component that shares one or more characteristics with image processing engine 106 may obtain the images for further processing. As an example, image processing engine 106 may obtain images from first vision sensor 110 that correspond to the images 300 and 310 of FIGS. 3A and 3B.

At block 604, a sequence of digital images is obtained from a second vision sensor integral to the robot while the robot moves along the trajectory. The second vision sensor may share one or more characteristics with second vision sensor 111 and may be integral to a robot that shares one or more characteristics with robot 100. In some implementations, a component that shares one or more characteristics with image processing engine 106 may obtain the images for further processing. As an example, image processing engine 106 may obtain images from second vision sensor 111 that correspond to the images 400 and 410 of FIGS. 4A and 4B.

At block 606, the first sequence of images is analyzed to determine a region pair between images and the major movement direction of the region. The region pairs may be identified by a component that shares one or more characteristics with image processing engine 106. For example, referring again to FIGS. 3A and 3B, image processing engine 106 may identify the tree 305 as a region that is included in both image 300 and 310. In some implementations, region pairs may be of any size and further, additional images may be utilized to identify region pairs between images. Once a region is identified in two or more images, direction determination engine 108 can determine a first major direction of movement of features in the images. For example, direction determination engine 108 may determine a major direction of feature movement for images 300 and 310 that is horizontal (or "x") based on determining that the region of interest moves horizontally between images.

At block 608, the second sequence of images is analyzed to determine a region pair between images and the major movement direction of the region. The region pairs may be identified by a component that shares one or more characteristics with image processing engine 106. For example, referring again to FIGS. 4A and 4B, image processing engine 106 may identify the tree 405 as a region that is included in both image 400 and 410. In some implementations, region pairs may be of any size and further, additional images may be utilized to identify region pairs between images. Once a region is identified in two or more images, direction determination engine 108 can determine a second major direction of movement of features in the images. For example, direction determination engine 108 may determine a major direction of feature movement for images 400 and 410 that is vertical (or "y") based on determining that the region of interest moves vertically between images.

At block 610, differences between the first and second major directions of feature movement are reconciled by either altering the orientation of one (or both) of the vision sensors or altering the orientation of the first or second sequence of images. The orientations may be reconciled by a component that shares one or more characteristics with sensor orientations adjuster 109 and/or image processing engine 106. For example, sensor orientation adjuster 109 may rotate one or both vision sensors to align the first and second major direction of feature movement. Also, for example, image processing engine 106 may alter the orientation of images of the first and/or second sequence of digital images so that the first and second major direction of movement coincide.

While the example of FIG. 6 and other examples herein describe reconciling orientations of two vision sensors, this is not meant to be limiting. Many robots are equipped with more than two vision sensors, such as three or more visions sensors. In various implementations, orientations of more than two vision sensors and/or the respective images they generate may be reconciled using techniques described herein.

Moreover, while in some examples described herein the same feature is visible in both vision sensors (e.g., the tree 305) and is used to perform techniques described herein, this is not meant to be limiting. Multiple vision sensors of a robot may be pointed in entirely different directions, such as in opposite directions, perpendicular directions (e.g., one vision captures the ground, another captures a side view), and at any other angle relative to each other. Features captured by one such vision sensor may be entirely different than features captured by another vision sensor. Nonetheless, techniques described herein may be used in conjunction with knowledge about how the multiple vision sensors are supposed to be oriented in order to reconcile their orientations appropriately.

Suppose a first vision sensor of a mobile robot is pointed towards the ground and a second vision sensor of the mobile robot is pointed to the robot's right hand side (i.e., 90 degrees clockwise from straight in front of the robot). In such case it might be the case that as the robot moves forward, the desired major direction of feature movement for the first vision sensor is top-to-bottom, while the desired major direction of feature movement for the second vision sensor is left-to-right, i.e., perpendicular to the desired major direction of feature movement of the first vision sensor. In various implementations, heuristics similar to those described previously may be defined to ensure that first and second vision sensors are rotated (or their images rotated) to yield respective major directions of feature movement that are appropriately oriented relative to one another.

Figure 7:
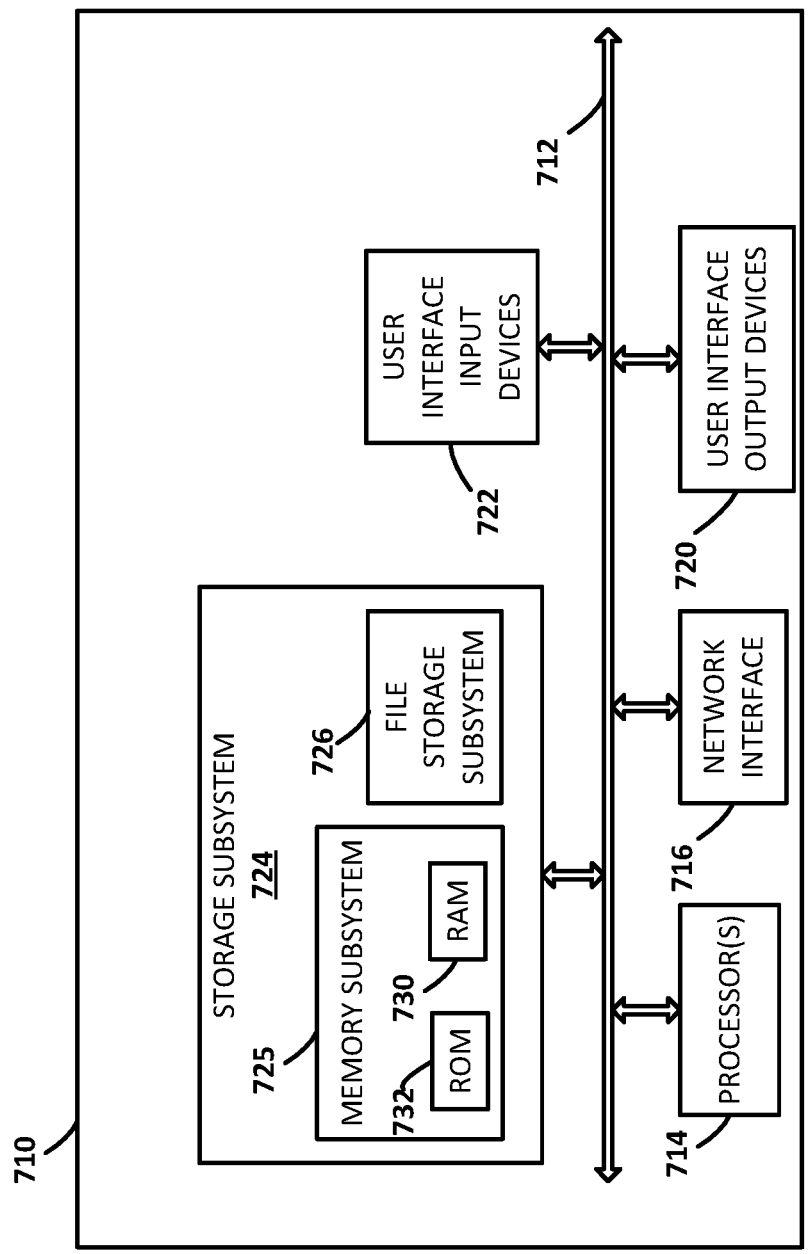
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method described herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 814.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining a first sequence of digital images captured by a first vision sensor integral with a robot while the robot moves along a trajectory;
    obtaining a second sequence of digital images captured by a second vision sensor integral with the robot while the robot moves along the trajectory;

analyzing two or more digital images of the first sequence to identify a first plurality of region pairs, wherein both regions of each region pair of the first plurality of region pairs include one or more pixels depicting a respective common feature of an environment captured across the two or more digital images of the first sequence;

analyzing two or more digital images of the second sequence to identify a second plurality of region pairs, wherein both regions of each region pair of the second plurality of region pairs include one or more pixels depicting a respective common feature of the environment captured across the two or more digital images of the second sequence;

analyzing the first plurality of region pairs to determine a first major direction of feature movement across the two or more digital images of the first sequence;

analyzing the second plurality of region pairs to determine a second major direction of feature movement across the two or more digital images of the second sequence;

reconciling any difference between the first and second major directions of feature movement by altering an orientation of:

one of the first and second vision sensors, or one or more digital images of the first or second sequence of digital images.

2. The method of claim 1, wherein the altering comprises rotating one or more digital images of the first or second sequence of digital images so that the first and second major directions of movement correspond.

3. The method of claim 1, wherein the altering comprises rotating the first or second vision sensor so that so that the first and second major directions of movement correspond.

4. The method of claim 1, wherein the first vision sensor comprises an RGB camera.

5. The method of claim 4, wherein the second vision sensor comprises an RGB camera.

6. The method of claim 4, wherein the second vision sensor comprises a 2.5D camera.

7. The method of claim 1, wherein each region of the first and second plurality of region pairs comprises a single pixel.

8. The method of claim 1, wherein analyzing the two or more digital images of the first sequence includes performing feature detection analysis.

9. The method of claim 1, wherein analyzing the two or more digital images of the first sequence includes performing feature matching.

10. A method implemented using one or more processors, comprising:

obtaining a first sequence of digital images captured by a first vision sensor integral with a robot while the robot moves along a trajectory, wherein each of the digital images of the first sequence is comprised of rows and columns of pixels;

analyzing two or more digital images of the first sequence to identify a first plurality of region pairs, wherein both regions of each region pair of the first plurality of region pairs include one or more of the pixels depicting a respective common feature of an environment captured across the two or more digital images of the first sequence;

analyzing the first plurality of region pairs to identify a first major direction of feature movement across the two or more digital images of the first sequence;

determining that the first major direction of feature movement is not parallel to a row or a column of pixels of the two or more digital images of the first sequence; and altering one of the first vision sensor or the two or more digital images of the first sequence of digital images to adjust the first major direction of feature movement to be parallel to a row or a column of the pixels.

11. The method of claim 10, further comprising:

obtaining a second sequence of digital images captured by a second vision sensor integral with the robot while the robot moves along the trajectory, wherein each of the images of the second sequence is comprised of rows and columns of pixels;

analyzing two or more digital images of the second sequence to identify a second plurality of region pairs, wherein both regions of each region pair of the second plurality of region pairs include one or more of the pixels depicting a respective common feature of the environment captured across the two or more digital images of the second sequence;

analyzing the second plurality of region pairs to identify a second major direction of feature movement across the two or more digital images of the second sequence; and reconciling any difference between the first and second major directions of feature movement by altering an orientation of:

the second vision sensor, or one or more digital images of the second sequence of digital images.

12. The method of claim 11, wherein altering the orientation of the second vision sensor includes rotating the second vision sensor.

13. The method of claim 11, wherein one of the first major direction of feature movement and the second major direction of feature movement is a preferred orientation, and wherein reconciling differences between the first and second major directions of feature movement includes altering the orientation so that the first major direction and second major direction are the preferred orientation.

14. The method of claim 10, wherein the first major direction of feature movement is a vector corresponding to feature movement in both vertical and horizontal directions.

15. The method of claim 10, wherein the first major direction of feature movement is an angle of movement relative to horizontal.

16. A system comprising one or more processors and memory storing instructions that, in response to execution of the instructions by the one or more processors, cause the one or more processors to perform the following operations:

obtaining a first sequence of digital images captured by a first vision sensor integral with a robot while the robot moves along a trajectory;

obtaining a second sequence of digital images captured by a second vision sensor integral with the robot while the robot moves along the trajectory;

analyzing two or more digital images of the first sequence to identify a first plurality of region pairs, wherein both regions of each region pair of the first plurality of region pairs include one or more pixels depicting a respective common feature of an environment captured across the two or more digital images of the first sequence;

analyzing two or more digital images of the second sequence to identify a second plurality of region pairs, wherein both regions of each region pair of the second plurality of region pairs include one or more pixels depicting a respective common feature of the environment captured across the two or more digital images of the second sequence;

analyzing the first plurality of region pairs to determine a first major direction of feature movement across the two or more digital images of the first sequence;

analyzing the second plurality of region pairs to determine a second major direction of feature movement across the two or more digital images of the second sequence;

reconciling any difference between the first and second major directions of feature movement by altering an orientation of:

one of the first and second vision sensors, or one or more digital images of the first or second sequence of digital images.

17. The system of claim 16, wherein the altering comprises rotating one or more digital images of the first or second sequence of digital images so that the first and second major directions of movement correspond.

18. The system of claim 16, wherein the altering comprises rotating the first or second vision sensor so that so that the first and second major directions of movement correspond.

19. The system of claim 16, wherein the first vision sensor comprises an RGB camera and the second vision sensor comprises a 2.5D camera.

20. The system of claim 16, further comprising instructions to perform the following operations:

obtaining a third sequence of digital images captured by a third vision sensor integral with the robot while the robot moves along the trajectory;

analyzing two or more digital images of the third sequence to identify a third plurality of region pairs, wherein both regions of each region pair of the third plurality of region pairs include one or more pixels depicting a respective common feature of the environment captured across the two or more digital images of the third sequence;

analyzing the third plurality of region pairs to determine a third major direction of feature movement across the two or more digital images of the third sequence;

reconciling any difference between the third major direction of feature movement, and the first and second major directions of feature movement by altering an orientation of:

one of the first, second, or third vision sensors, or one or more digital images of the first, second, or third sequence of digital images.

* * * * *